United States Patent
Cran et al.

(10) Patent No.: US 10,972,494 B2
(45) Date of Patent: Apr. 6, 2021

(54) VULNERABILITY DETECTION IN IT ASSETS BY UTILIZING CROWDSOURCING TECHNIQUES

(71) Applicant: BugCrowd, Inc., San Francisco, CA (US)

(72) Inventors: Jonathan Cran, San Francisco, CA (US); Michael James O'Kelly, Mountain View, CA (US); Casey John Ellis, Lafayette, CA (US)

(73) Assignee: BugCrowd, Inc., San Francisco, CA (US)

( * ) Notice: Subject to any disclaimer, the term of this patent is extended or adjusted under 35 U.S.C. 154(b) by 810 days.

(21) Appl. No.: 15/289,807

(22) Filed: Oct. 10, 2016

(65) Prior Publication Data

US 2018/0103054 A1    Apr. 12, 2018

(51) Int. Cl.
*H04L 29/06*   (2006.01)
*G06N 20/20*   (2019.01)
*G06N 5/00*    (2006.01)
*G06N 20/00*   (2019.01)

(52) U.S. Cl.
CPC ......... *H04L 63/1433* (2013.01); *G06N 20/00* (2019.01); *H04L 63/20* (2013.01); *G06N 5/003* (2013.01); *G06N 20/20* (2019.01)

(58) Field of Classification Search
CPC .......................... H04L 63/1433; H04L 63/20
USPC ......................................................... 726/25
See application file for complete search history.

(56) References Cited

U.S. PATENT DOCUMENTS

| | | | |
|---|---|---|---|
| 8,831,358 B1* | 9/2014 | Song | G06K 9/46 382/218 |
| 9,015,847 B1 | 4/2015 | Kaplan et al. | |
| 9,223,978 B2 | 12/2015 | Kraemer | |
| 9,413,780 B1 | 8/2016 | Kaplan et al. | |
| 9,473,524 B2 | 10/2016 | Kaplan et al. | |
| 2003/0009696 A1 | 1/2003 | Bunker et al. | |

(Continued)

FOREIGN PATENT DOCUMENTS

EP    2284757 A1    2/2011

OTHER PUBLICATIONS

BUGCROWD, "Fully Managed Bug Bounties", https://web.archive.org/web/20140125092649/https://bugcrowd.com, Dec. 31, 2012, San Francisco, CA, USA.

(Continued)

*Primary Examiner* — Angela R Holmes
(74) *Attorney, Agent, or Firm* — Asif Ghias (57) ABSTRACT

This invention discloses systems and methods for detecting vulnerabilities in IT assets by utilizing crowdsourcing techniques. A corpus containing vulnerability data of IT assets with known vulnerabilities is established. Vulnerability data in the corpus comprises security aspects or attributes related to the IT assets. The security aspects of an IT asset constitute its attack surface which is represented as a feature vector in a feature space. A determination is made as to how similar/close a target asset whose unknown vulnerabilities are to be detected, is to the rest of the IT assets in the corpus. This determination is made based on a measure of similarity/distance between the respective feature vectors in the feature space. Based on the review of similarity results by a community of researchers/experts, a determination of unknown vulnerabilities in the target system is made.

10 Claims, 6 Drawing Sheets

(56) References Cited

U.S. PATENT DOCUMENTS

| | | | |
|---|---|---|---|
| 2003/0074368 A1* | 4/2003 | Schuetze | G06F 16/5846 |
| 2003/0083942 A1 | 5/2003 | Mallon et al. | |
| 2004/0006704 A1 | 1/2004 | Dahlstrom et al. | |
| 2004/0268343 A1* | 12/2004 | Howard | G06F 21/577 |
| | | | 717/174 |
| 2007/0067846 A1* | 3/2007 | McFarlane | G06F 21/577 |
| | | | 726/25 |
| 2007/0067848 A1 | 3/2007 | Gustave et al. | |
| 2008/0222731 A1 | 9/2008 | Dowd et al. | |
| 2010/0287128 A1* | 11/2010 | Baltatu | G06K 9/6284 |
| | | | 706/12 |
| 2012/0123959 A1 | 5/2012 | Davis et al. | |
| 2013/0254880 A1 | 9/2013 | Alperovitch et al. | |
| 2014/0325660 A1* | 10/2014 | Jajodia | G06F 21/577 |
| | | | 726/25 |
| 2014/0344937 A1* | 11/2014 | Sabin | H04L 63/1433 |
| | | | 726/25 |
| 2015/0254596 A1 | 9/2015 | Nayar et al. | |
| 2015/0381637 A1* | 12/2015 | Raff | H04L 63/0218 |
| | | | 726/23 |
| 2016/0162690 A1* | 6/2016 | Reith | G06F 21/577 |
| | | | 726/25 |
| 2016/0269438 A1* | 9/2016 | Kaplan | G06Q 50/01 |

OTHER PUBLICATIONS

CERT, "Vulnerability Disclosure Policy", https://www.cert.org/vulnerability-analysis/vul-disclosure.cfm?, Oct. 12, 2016, Pittsburgh, USA.

Christey, Steve et al., "Responsible Vulnerability Disclosure Process, draft-christey-wysopal-vuln-disclosure-00.txt", Internet Engineering Task Force, Feb. 1, 2002, Bedford, MA, USA.

Finifter, Matthew, "An Empirical Study of Vulnerability Rewards Programs", 22nd USENIX Security Symposium, Aug. 14, 2013, Washington D.C., USA.

Howe, Jeff, "The Rise of Crowdsourcing", WIRED Magazine, Jun. 1, 2006, USA.

ISO, "Information technology—Security techniques—Vulnerability disclosure", 1st. Edition, Feb. 15, 2014, Reference No. ISO/IEC 29147(E), Switzerland.

Kanich, Chris, "Putting Out a HIT: Crowdsourcing Malware Installs", University of California San Diego, San Diego, USA.

Latoza, Thomas D, "Microtask Programming: Building Software with a Crowd", Oct. 5, 2014, UC Irvine, Irvine, CA, USA.

Microsoft, "Coordinated Vulnerability Disclosure", https://technet.microsoft.com/en-us/security/dn467923.aspx, Oct. 12, 2016, USA.

Mozilla, "Handling Mozilla Security Bugs", http://Mozilla.org/en-US/about/governance/policies/security-groups/bugs/, Oct. 12, 2016, USA.

Ozment, Andy, "Bug Auctions: Vulnerability Markets Reconsidered", Workshop on Economics and Information Security, May 13, 2004, Minneapolis, MN, USA.

Packetstormsecurity, "Full Disclosure Policy(RFPolicy) v2.0", https://dl.packetstormsecurity.net/papers/general/rfpolicy-2.0.txt, Oct. 12, 2016, USA.

Ransbotham, Sam, "Are Markets for Vulnerabilities Effective?", MIS Quarterly, Jan. 1, 2012, vol. 35, No. X, USA.

RAPID7, "Vulnerability Disclosure Policy", https://www.rapid7.com/disclosure.jsp, Oct. 12, 2016, Boston, MA, USA.

Schechter, Stuart, "How to buy better testing", Harvard University, Boston, MA, USA.

TIPPINGPOINT, "Why Did We Create the Zero Day Initiative?", https://web.archive.org/web/20130423130619/http://zerodayinitiative.com/about/, Apr. 23, 2013, USA.

Verma, Rohit, "Security Services using Crowdsourcing", 5th International Conference on Ambient Systems, Networks and Technologies (ANT-2014), Procedia Computer Science, Jun. 5, 2014, India.

Zogaj, S. "Managing Crowdsourced Software Testing—A Case Study Based Insight on the Challenges of a Crowdsourcing Intermediary", Journal of Business Economics (JBE) (DOI: 10.1007/s11573-014-0721-9), Feb. 20, 2014, Berlin, Germany.

Cui, Weidong et al., "ShieldGen: Automatic Data Patch Generation for Unknown Vulnerabilities with Informed Probing", Mcirosoft & Columbia University Dept. of Computer Science, May 20, 2007, (15 pgs.).

CVE, Security Vulnerability Database, CVE Details, downloaded on: Jul. 27, 2016, CVE: http://www.cvedetails.com/index.php.

Dimov, Daniel, "Using Crowdsourcing for Collecting Information about Security Vulnerabilities", Hacking, Feb. 2, 2013, 11 pgs., Ethical Hacking Boot Camp Course: http://resources.infosecinstitute.com/crowdsourcing-for-collecting-information-security-vulnerabilities/.

Irwin, Stephen, "Creating a Threat Profile for Your Organization", The SANS Institute, Sep. 9, 2014, 32 pgs.

Kenna Security, Inc., "Security Vulnerability & Risk Intelligence", Kenna Threat Management Platform, Jul. 26, 2016, 3 pgs., http://www.kennasecurity.com/features.

Manadhata, Pratyusa K, et al., "An Attack Surface Metric", IEEE Transactions on Software Engineering, Jun. 7, 2010, pp. 1-17.

Neuhaus, Stephen et al., "Security Trend Analysis with CVE Topic Models", IEEE, Sep. 1, 2010, 10 pgs.

NIST, "National Vulnerability Database", National Institute of Standards, NVD Home, Jul. 26, 2016, 2 pgs.

Offensive Security, "Google Hacking Database", Offensive Security, Google Dorks, Jul. 27, 2016, 3 pgs., http://www.exploit-db.com/google-hacking-database/.

Offensive Security, "The Exploit Database: Offensive Security Exploit Database Archive", Offensive Security, Jul. 27, 2016, 12 pgs., http://www.exploit-db.com/google-hacking-database/.

Synack, "The Synac Solution—Keeping You One Step Ahead of the Adversary", Synac, Optimal Pairing of Man and Machine, Jul. 27, 2016, 5 pgs., http://www.synack.com/solution/.

Verizon, "2016 Data Breach Investigations Report", Verizon, Jul. 27, 2016, pp. 1-85.

Wang, Ju An, et al., "Measuring Similarity for Security Vulnerabilities", IEEE Computer Society, Proceedings of the 43rd Hawaii International Conference on System Sciences, Jan. 1, 2010, pp. 1-10.

* cited by examiner

VULNERABILITY DETECTION IN IT ASSETS BY UTILIZING CROWDSOURCING TECHNIQUES

FIELD OF THE INVENTION

This invention relates generally to cybersecurity and specifically to techniques related to detecting vulnerabilities in IT systems by utilizing the potential of a crowd/community.

BACKGROUND ART

The detection of IT vulnerabilities and IT security remains an area of active interest among government agencies, and private sector entities, both large and small, private or public. The news of vulnerability exploits, and hacking of IT assets is a familiar phenomenon to most business professionals in today's interconnected world. Unsurprisingly, a lot of attention and focus has been devoted by many organizations and academic institutions in developing platforms, tools and ideas that can detect vulnerabilities and misconfigurations in an organization's IT infrastructure.

A timely detection of the vulnerabilities/bugs in an IT infrastructure is essential for their proper and timely remedy/fix. As a consequence of timely fixes of these vulnerabilities, their exploitation by adversaries can be prevented. Otherwise, such exploitation can have catastrophic consequences for the respective businesses, organizations and/or their customers/partners.

There are many ways of detecting and addressing vulnerabilities in IT assets in the prior art. U.S. Patent Publication No. 2007/0067848 A1 to Gustave discloses security vulnerability information aggregation techniques in which vulnerability information associated with one or more security vulnerabilities is obtained from multiple sources and aggregated into respective unified vulnerability definitions. Aggregation may involve format conversion, content aggregation, or both. The definitions may be distributed to vulnerability information consumers in accordance with consumer-specific policies. Storage of vulnerability information received from the sources could allow the aggregation process to be performed on existing vulnerability information retroactively.

NPL reference "Using Crowdsourcing for Collecting Information about Security Vulnerabilities" by Infosec Institute, dated 2013 explores the possibilities for using crowdsourcing for collecting information about security vulnerabilities, such as software bugs. In particular, the article discusses online competitions in which participants try to find out security vulnerabilities in software applications, collecting information about security from consumers and collection information about security vulnerabilities from the web.

NPL reference "Security Trend Analysis with CVE Topic Models" by Neuhaus, dated 2009 explores the vulnerability reports in the Common Vulnerability and Exposures (CVE) database by using topic models on their description texts to find prevalent vulnerability types and new trends semi-automatically. In their study of the 39,393 unique CVEs until the end of 2009, they identify the following trends, given here in the form of a weather forecast:

PHP: declining, with occasional SQL injection.
Buffer Overflows: flattening out after decline.
Format Strings: in steep decline.
SQL Injection and XSS: remaining strong, and rising.
Cross-Site Request Forgery: a sleeping giant perhaps, stirring.
Application Servers: rising steeply.

Non-Patent Literature (NPL) reference "Offensive Security Exploit Database Archive" dated Jul. 27, 2016 at website https://exploit-db.com is an exploits database. The database is an archive of exploits and is maintained by Offensive Security. According to the website, Offensive Security is an information security training company that provides various Information Security Certifications as well as high end penetration testing services. The Exploit Database is a non-profit project that is provided as a public service by Offensive Security.

A shortcoming of the prior art teachings is that they do not fully exploit the potential of a crowd and online communities in the detection of IT vulnerabilities. They fail to teach how to detect vulnerabilities in a target asset or system that is one of several IT assets or systems belonging to various organizations. They are also silent about establishing attack surfaces for IT assets, and representing these attack surfaces as feature vectors in an attack surface vector space or a feature vector space or simply put, a feature space. They are also silent about detecting vulnerabilities in the target asset/system based on a measure of similarity between the target asset/system and a collection of other IT assets/systems with known vulnerabilities.

OBJECTS OF THE INVENTION

In view of the shortcomings of the prior art, it is an object of the present invention to provide a system and methods for detecting IT vulnerabilities using the full power of online crowd and communities.

It is another object of the invention to detect IT vulnerabilities in a target system from amongst IT assets/systems belonging to one or more organizations.

It is another object of the invention to establish a corpus or collection of IT vulnerabilities related to IT assets belonging to one or more organizations. It is yet another object of the invention to establish an attack surface for each asset in the corpus.

It is still another object of the invention to detect IT vulnerabilities in a target system based on a similarity measure between the target asset/system and various other assets/systems with known vulnerabilities.

Still other objects and advantages of the invention will become apparent upon reading the detailed description in conjunction with the drawing figures.

SUMMARY OF THE INVENTION

The objects and advantages of the invention are secured by a system and methods of detecting vulnerabilities in IT assets. A corpus containing known vulnerabilities, or vulnerability data of IT assets with known vulnerabilities, is established. Vulnerability data in the corpus comprises security aspects or attributes related to the IT assets. The IT assets may belong to one or more organizations, companies or entities. The security aspects of an IT asset constitute its attack surface. A target asset amongst all IT assets refers to the asset whose unknown IT vulnerabilities are desired/targeted to be detected.

A similarity measure between the attack surface of the target asset and the attack surfaces of the rest of the IT assets in the vulnerability corpus is made. Based on this measure of similarity, or similarity measure for short, a determination of the unknown vulnerabilities in the target IT asset/system is made.

In a highly preferred embodiment, the results of the similarity measurements are reviewed by a community of researchers/experts who then ultimately determine/detect the unknown vulnerabilities in the target asset. Preferably, the community of researchers/experts helps establish the corpus of known vulnerabilities in IT assets. This may be accomplished by the researchers participating in bounty programs, or by the researchers providing vulnerability reports containing vulnerability data about the IT assets.

Bounty programs are rewards based initiatives aimed at finding bugs/vulnerabilities in IT assets. Typically, bounty programs are participated in by the crowd at large, however bounty programs may also be private and exposed only to participants of a certain affiliation. Moreover, researchers/experts may also participate in the bounty programs.

Preferably, the corpus of known vulnerabilities is populated by inspecting/analyzing and harvesting vulnerability data from public discussions about certain assets or certain entities owning/operating/associated with the assets. The entities/companies may be IT vendors, their customers, IT organizations or consortiums, etc. In an alternative embodiment, the corpus of known vulnerabilities is populated by analyzing relevant online forums for vulnerability data on the assets. In still another variation, vulnerability data on the IT assets may be gleaned by scraping websites belonging to entities relevant to the IT assets.

Still in other embodiments, the corpus of known vulnerabilities is populated by utilizing user-reported (obtained from the user of the asset), self-reported (obtained from the relevant entities owning/operating the asset), publicly available (available in public domain), researcher-sourced (obtained from security researchers/experts) and/or crowd-sourced vulnerability data.

In a highly preferred embodiment, the attack surface of an IT asset is represented as a feature vector in a feature space. Then the determination as to how similar/close a target asset is to the other IT assets in the corpus, is made based on a measure of similarity/distance, or similarity measure for short, between their respective feature vectors in the feature space. This similarity measure is used as the basis for detecting unknown vulnerability/vulnerabilities in the target asset. More similar the target asset is to a particular IT asset with known vulnerabilities, more alike are the vulnerabilities of the target asset to the other asset with the known vulnerabilities.

The results of the similarity measurements are preferably reviewed by one or more researchers/experts of a crowd-sourced community/crowd. Preferably, one or more researchers are matched to the target asset based on his/her/their skills and background. Then based on the review of the similarity results by the researcher(s), a determination of unknown vulnerabilities in the target system is ultimately made.

In some embodiments, unknown vulnerabilities thus detected are used for the purposes of sales, marketing, operations and/or to make appropriate recommendations to the relevant entity/entities. Alternatively, the unknown vulnerabilities detected using the above techniques are used to generate and maintain a vulnerability rating for IT systems/assets and the associated entities. The vulnerability rating may be updated as frequently as desired, and may span all assets/entities, or to assets/entities belonging to certain industry verticals, or to certain asset types, entity types, etc.

The similarity measure between the target feature vector of the target asset and the feature vectors of the other IT assets, may be a Euclidean distance between them in the feature space. Alternatively, the similarity measure may be a Cosine similarity between unit-length normalized feature vectors in the feature space. In still an alternative variation, the similarity measure may be determined by utilizing machine learning techniques. Such techniques may employ supervised and/or unsupervised aspects of machine learning.

Preferably the vulnerability in the target system thus detected is a zero-day vulnerability thus preventing a potentially catastrophic fallout from its exploitation by adversaries.

Clearly, the system and methods of the invention find many advantageous embodiments. The details of the invention, including its preferred embodiments, are presented in the below detailed description with reference to the appended drawing figures.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
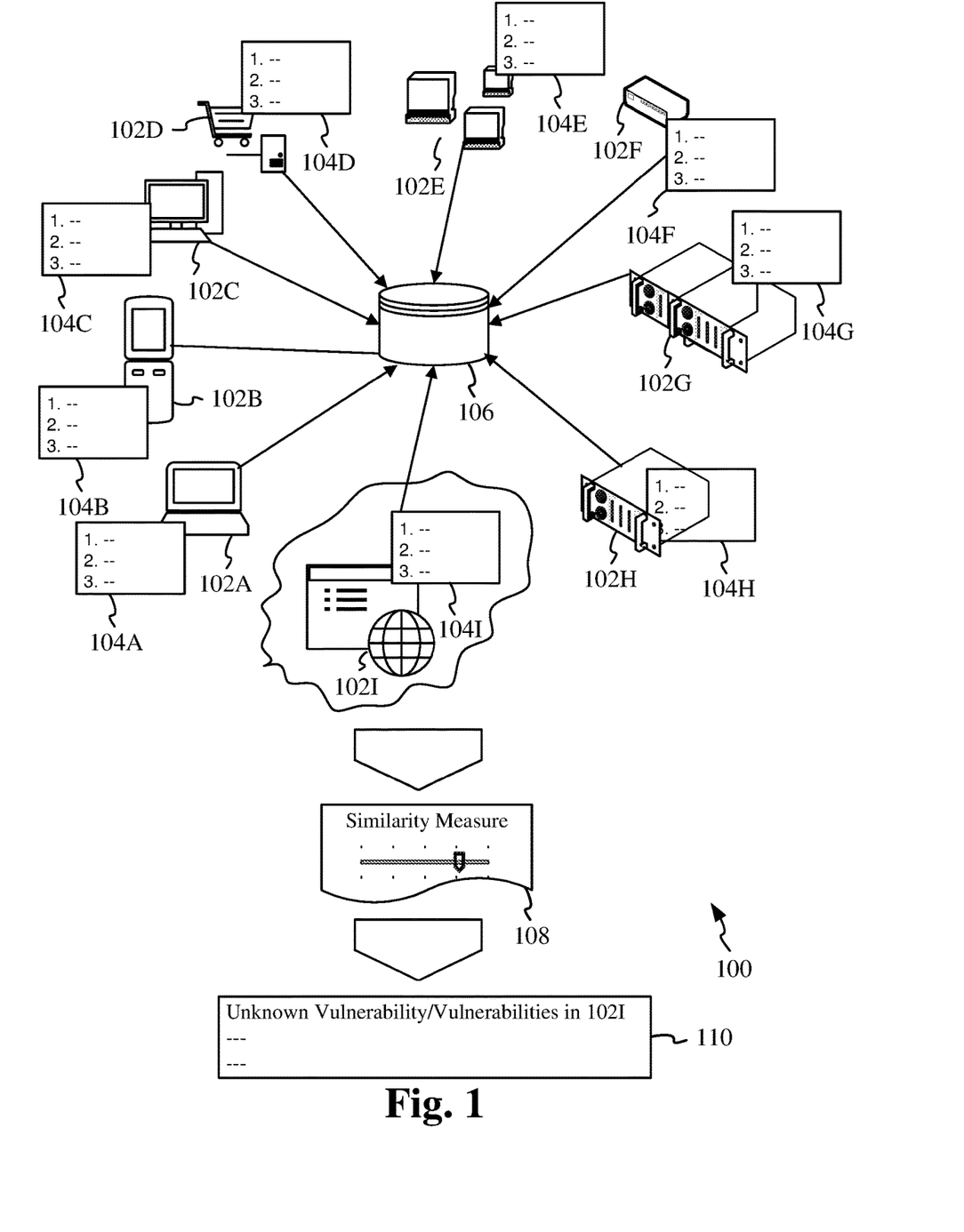
FIG. 1 is the conceptual diagram of a cybersecurity vulnerability/vulnerabilities detection system according to the present invention.

The present invention will be best understood by first reviewing cybersecurity or vulnerabilities detection system 100 according to the current invention as illustrated in FIG. 1. Vulnerabilities detection system 100 comprises a number of information technology (IT) assets 102A, 102B, . . . 102I. IT assets 102A-I may take various forms. Specifically, asset 102A is a laptop computer, asset 102B is a mobile phone, asset 102C is a desktop computer, asset 102D is an e-commerce platform, asset 102E is a collection of workstation nodes, asset 102F is a router, asset 102G is a collection of racks of datacenter servers which could be of any type, asset 102H is a file server and asset 102I is a web server. In this disclosure, we will use the term asset or system to generally mean any IT product including platform, hardware, firmware, software, operating systems, databases, programming environments, etc.

Obviously, any other types and numbers of assets may also be present other than the ones explicitly illustrated in FIG. 1 as will be recognized by a person of average skill in the art. According to the invention, asset 102I is of special interest because it is the target asset in which IT vulnerability/vulnerabilities are to be detected. That is why IT asset 102I is shown with a free-form shape around it. Vulnerabilities detected by system 100 in asset 102I may allow exploitative attacks by potential adversaries or hackers. Such vulnerabilities/attacks include, but are not limited to code injection vulnerabilities, buffer overflows, sensitive data exposure (e.g. in plaintext), broken authentication and session management, $2^{nd}$ order attacks such as cross-site scripting (XSS) attacks, etc.

It should also be noted that IT assets/systems 102A-I may belong to one or more organizations, companies or entities within the scope of the present invention. Furthermore, assets 102A-I may be owned outright by one or more such entities, rented/leased by one or more such entities or may be shared amongst a number of such entities in an IT cloud. The cloud may be public, private, semi-private or some combination of the above. The present invention is agnostic of the vast variety of such IT infrastructure and platform choices that will be familiar to a person of ordinary skill. Therefore, in order to not be detracted, we will focus on the embodiment(s) detailed in FIG. 1 with the knowledge of the wider applicability of the principles of the invention to the many alternative IT variations known to those having skill in the art.

System 100 shown in FIG. 1 further has attack surfaces 104A-I corresponding to each IT asset 102A-I. Specifically, there is an attack surface 104A associated with IT asset 102A, an attack surface 104B associated with asset 102B and so on. Note that attack surface 104I is associated with target IT asset 102I. Further, there is a collection 106 of known vulnerabilities related to IT assets/systems 102A-I. Collection 106 is being represented as a database or a data warehouse in FIG. 1, 340 however the invention admits of other alternative schemes for housing known vulnerabilities of IT assets 102A-I. These include data warehouse(s), data mart(s), Big Data cluster(s), File System(s), In-Memory database(s), etc. Moreover, corpus or collection 106 itself may consist of several computing/data nodes. Many such alternatives, along with their respective hardware/software platforms, interfaces and architectures, are conceivable as will be recognized by a person of average skill.

Those skilled in the areas of computer security will be familiar with the general concept of an attack surface. An attack surface represents the overall collection of points or "attack vectors" using which, an adversary or an attacker or an unauthorized user can try to enter an IT environment or extract data from it. In the context of the present invention, we will use the notion of an attack surface to mean the collection of vulnerability or security attributes, properties or aspects related to the corresponding IT asset. A distinguishing feature of the present invention is that an attack surface is represented as a feature vector. The above concepts will be taught in detail further below.

Returning our attention to FIG. 1, we recall that cybersecurity system 100 has a target system/asset 102I amongst a number of systems/assets 102A-I. These assets may belong to one or several distinct companies, organizations or entities. In cybersecurity system 100 and its embodiments, we are interested in discovering one or more unknown vulnerabilities in IT asset or system 102I. According to the invention, a similarity measure 108 between target asset 102I and the remainder of IT assets 102A-H is established. This similarity measure(s) is based on attack surface 104I associated with target asset 102I and attack surfaces 104A-H associated with the remainder of IT assets 102A-H.

Since system 100 has the knowledge of the known vulnerabilities belonging to IT assets 102A-I in its collection 106, similarity measure 108 is an indicator of the similarity of attack surface of interest 104I with attack surfaces 104A-H corresponding to assets 102A-H with known vulnerabilities. Then, based on similarity measure 108, system 100 determines, detects or diagnoses one or more unknown vulnerabilities 110 related to target asset/system 102I. It should be noted that known vulnerabilities collection 106 may comprise vulnerabilities related to assets 102A-H, as well as any known vulnerabilities in target asset 102I itself. The determination of any unknown vulnerabilities 110 in system 102I is however based on the similarity of its attack surface 104I with attack surfaces 104A-H of the remainder IT assets 102A-H excluding target asset 102I.

Note that we may use the term similarity measure, represented by reference numeral 108 in FIG. 1, in the singular. However, it is understood that the similarity measure is determined between the target asset (or more specifically its attack surface or feature vector as taught below) and the remainder of IT assets (or more specifically their corresponding attack surfaces or feature vectors as taught below). As such, multiple measurements of the similarity measure will be taken, each between the target asset and each of the remainder or rest of the IT assets excluding the target asset. Based on these multiple similarity measure measurements, then a determination is made as to which IT asset, the target asset most closely resembles or matches. More specifically, based on multiple similarity measurements, the determination is made as to which attack surface from the remainder attack surfaces associated with the remainder IT assets, the target attack surface associated with the target IT asset, is most similar to.

However, in order to avoid unnecessary repetition, this disclosure will use the term similarity measure in the singular with the knowledge of multiple measurements implied thereby, and any distinction between the singular and plural usage drawn as and when needed. As will be taught in detail below, the attack surfaces are represented by feature vectors according to the invention. So, the similarity measure is eventually determined between the target feature vector representative of the target attack surface associated with the target IT asset, and the feature vectors representative of the attack surfaces associated with the remainder IT assets excluding the target IT asset.

Figure 2:
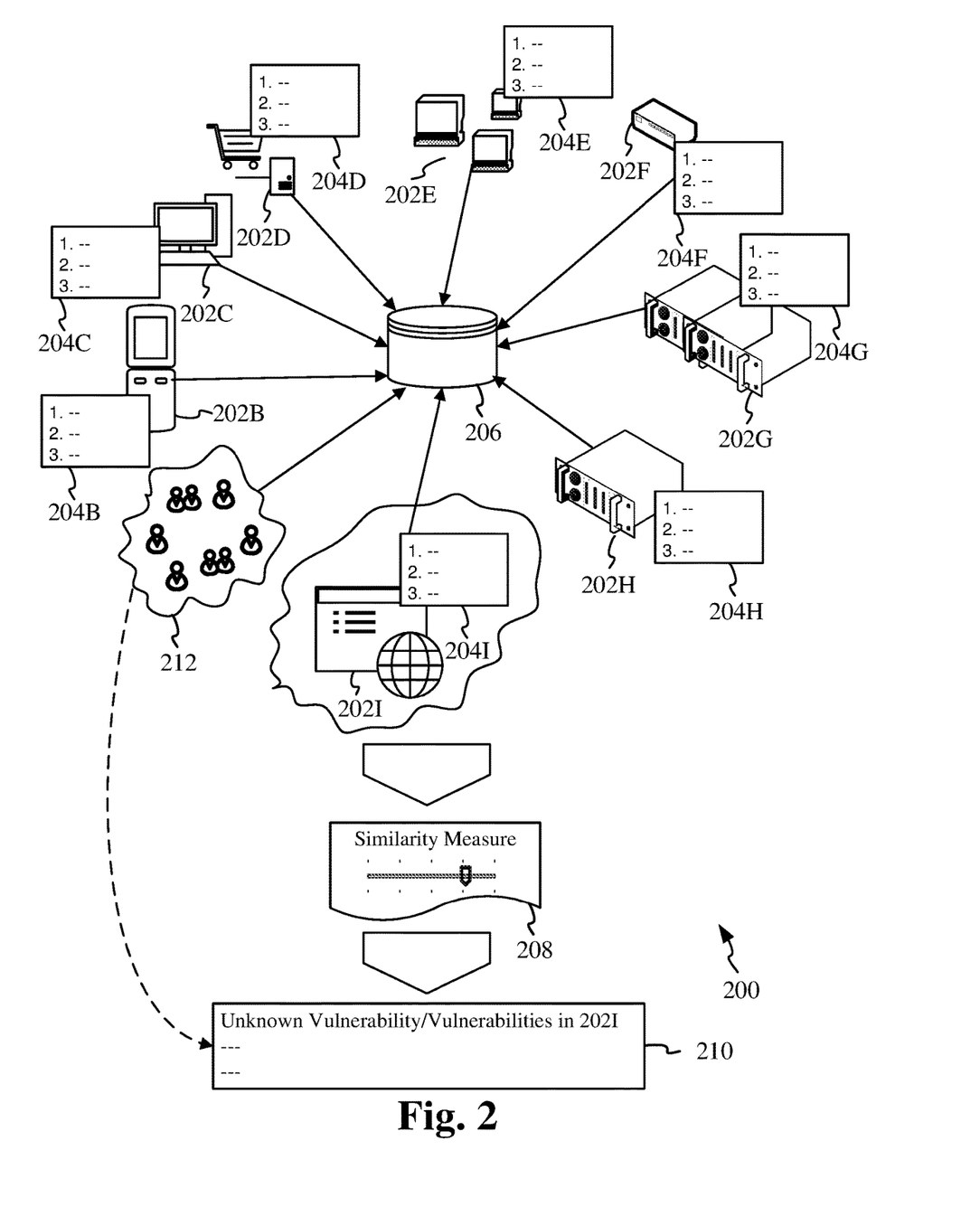
FIG. 2 is a variation of FIG. 1 employing a crowd and/or a community in the detection of vulnerability/vulnerabilities.

In the preferred embodiment, the invention utilizes a community of researchers to assist in the detection of vulnerabilities in target system 102I. Such a preferred embodiment is shown in FIG. 2 where cybersecurity system 200 utilizes a community of researchers or experts 212 to detect one or more vulnerabilities 210 in target asset 202I from amongst IT assets 202B-I. Note the similarity between the embodiments shown in FIG. 1 and FIG. 2 and the likeness of reference numerals. For clarity of illustration we have removed asset 102A and its attack surface 104A from FIG. 1 in FIG. 2 with no loss of generality of the many different types of IT assets conceivable in system 200 within the scope of the invention. However, the main difference between the embodiments of FIG. 1 and FIG. 2 is that a community of researchers 212 provides the "human" skill and knowledge in the detection of unknown vulnerabilities in target asset 202I by cybersecurity system 200.

A salient feature of the instant invention is its ability to utilize the immense power and capabilities of a community and/or crowd for vulnerability detection. In other words, the invention allows for tapping into the collective human skills and knowledgebase of a crowd or community, not otherwise available in traditional security systems/programs for detecting unknown vulnerabilities in a target system such as asset 202I of FIG. 2.

Note that similar to FIG. 1, the present embodiment(s) also have a corpus or collection 206 of known vulnerabilities in IT assets 202B-I against which the target system is matched. The matching or similarity determination is accomplished on the basis of a similarity measure 208 between target attack surface 204I of the target system 202I and attack surfaces 204B-H of the remainder of IT assets/systems 202B-H excluding target asset/system 202I. Vulnerabilities are detected based on the similarity of the target asset with an asset or assets of known vulnerability/vulnerabilities. As in the embodiment(s) of FIG. 1, collection 206 of known vulnerabilities data may comprise vulnerabilities related to assets 202B-H, as well as any known vulnerabilities in target asset 202I itself. The determination of any unknown vulnerabilities 210 in asset 202I is however based on the similarity of its attack surface 204I with attack surfaces 204B-H of the remainder IT assets 202B-H excluding target IT asset 202I.

Preferably, corpus 206 of known vulnerabilities is also populated with the assistance of a crowd or community 212. One way this is accomplished is by executing bounty programs for the discovery of bugs/vulnerabilities in assets 202B-I and thusly populating vulnerability collection 206. A bounty program is a reward based "call for action" to an (online) crowd for discovering bugs/vulnerabilities in a target asset/system. The crowd is thus motivated by the reward to discover bugs or vulnerabilities in the target system for which the bounty program is run. Another way researchers may assist in the establishment, enrichment and population of corpus 206 is by providing vulnerability reports containing vulnerability data on assets 202B-I.

Those familiar with crowdsourcing will recognize that sometimes the term crowd is used to refer to a large, unstructured and uncultivated group of online participants/users. On the other hand, a community is oftentimes used to refer to a smaller group of curated or cultivated set of participants with a more specialized function or objective than the crowd at large. In the context of the present invention, a crowd will be typically used in bounty programs for discovering vulnerabilities in IT assets. A community of researchers on the other hand will be a set of security experts with specialized expertise in various security areas.

Aside from their specialized expertise, researchers/experts may also participate in bounty programs with the crowd for the discovery of bugs while at other times they may perform specialized researcher functions. In other words, sometimes one or more researchers/experts from the researcher community may be a part of the larger crowd and other times not. Also, the researchers/experts may be in-house to an organization or external.

Furthermore, bounty programs may themselves be public i.e. open to all online participants or private i.e. open to certain subset of online participants, e.g. those affiliated with an entity. To avoid unnecessary duplication and confusion in illustration, FIG. 2 would thus represent both the larger crowd of online participants (public or private) familiar in a crowdsourcing model/environment, as well as the specialized community of security experts/researchers (in-house or external), by reference numeral 212.

According to a preferred embodiment, one or more researchers from community 212 may be matched to target asset 202I based on the specification of system 202I and the security skills, expertise and/or technical background of the researcher(s). Such a matching would naturally assist in an efficient determination of unknown vulnerabilities in target system 202I because the background of the matched researcher(s) would lend them to be familiar to the security issues relevant to asset 202I.

The present invention utilizes tools, techniques and approaches for establishing a rich corpus of known vulnerabilities in the IT assets. These approaches can also be utilized using a crowdsourcing model for leveraging the power of crowd/communities. For example, rewards based initiatives or bounty programs may be initiated to motivate a crowd or a specialized community of experts/researchers in carrying out the following functions and activities. Of course, the community of experts may also be internal or in-house to an organization in which case their incentive structure may be employment based.

Specifically, for the population of corpus 106 of FIG. 1 or 206 of FIG. 2, these approaches include inspecting public discussions about certain assets and/or their associated entities/companies, which may reveal present or past vulnerabilities in those assets. Such inspection could include manual studying of these public discussions or online tools to search and analyze, using keywords or otherwise, the vast amount of published content available in "blogosphere". Additionally, the public discussions may also be offline comments or include remarks made by personnel relevant to the IT asset(s) in question. The entities/companies may be IT vendors, their customers, IT organizations/consortiums, etc.

Similarly, corpus 106/206 may also benefit by scrutinizing various online forums where information related to vulnerabilities in IT assets 102A-I/202B-I from FIG. 1/FIG. 2 may be discussed. As in the case of public discussions, this scrutiny may involve manual perusal of the content of these forums or automatic tools to analyze them, or both. A few examples of such online forums include Information Security Forum (http://www.securityforum.org), CNet's security forum, Microsoft's Security Bulletins, security forums hosted by various IT vendors and IT organizations such as The Open Group (http://wwopengroup.org), BugTraq (http://seclists.org/bugtraq/) and FullDisclosure (http://seclists.org/fulldisclosure/). The vast array of online resources and forums where such security matters related to the IT assets in question may be discussed, will be available to a person of average skill.

Owing to the increasing awareness about IT security and the interest in this subject by the IT vendors, service providers and various IT consortiums writ large, the present invention is able to benefit by tapping into as many of the relevant forums as practicable. It can then sift out information related to present or past known vulnerabilities in IT assets 102A-I/202B-I of FIG. 1/FIG. 2 in order to enrich its known vulnerability collection/database 106/206.

The exact tools and techniques for parsing the content and information from the above sources, whether manually or automatically, and its conversion into the appropriate form for population into corpus 106/206, will be based on the specific requirements of an implementation. For example, the online content may be searched with keywords, using a popular search engine, and the results manually scrutinized. Entries of known vulnerabilities related to assets 102A-I/202B-I of FIG. 1/FIG. 2 may then be entered into corpus 106/206. The entries may be performed using a form or a script that enters data in adherence to the appropriate data model of corpus 106/206. The vast array of the choices of such techniques and tools will be familiar to a person of average skill and will not be delved into detail here.

Corpus 106/206 of FIG. 1/FIG. 2 can also be enriched by scraping the websites of the various entities that assets 102A-I/202B-I of FIG. 1/FIG. 2 belong to or are associated with. Again, those familiar in the art of web technologies will understand the various techniques, tools and technologies for website scraping and those will not be delved into in this specification. The purpose of scraping the websites of the entities relevant to assets 102A-I/202B-I of FIG. 1/FIG. 2 is to glean information that may be pertinent to identifying known vulnerabilities in those assets. For example, such information may include any security updates/patches provided by IT vendors for the assets, or any security recommendations to the users of these systems.

Vulnerability collection/corpus 106/206 may also be populated based on vulnerabilities discovered directly in IT assets 102A-I/202B-I of FIG. 1/FIG. 2. Such direct discovery may be as a result of penetration or other types of tests performed on the assets or an indirect observation from past experience of using the assets. As mentioned, any of the above activities may be carried out with the assistance of a larger crowd and/or a smaller community of researchers or experts, who may be in-house or external.

As already explained, corpus 106/206 houses the vulnerability data related to IT assets 102A-I/202B-I of FIG. 1/FIG. 2 respectively. The vulnerability data is housed according to an appropriate structure or data model for the corpus. For example, the data may be structured at the top level according to entities/organizations such as IT vendors, and their products (hardware, software, etc.). Then underneath at the second level of the corpus structure or data model, vulnerability data may be organized by the IT assets belonging to the various entities/organizations. In an alternative implementation, the structure or data model of the corpus may be flat and organized by individual assets in the corpus along with their vulnerability data. Still alternative structures and models for housing corpus data are conceivable within the scope of the invention.

The vulnerability data associated with each IT asset 102A-I/202B-I of FIG. 1/FIG. 2 may include security aspects, attributes, properties or paths knowing, using or exploiting which, an intruder may exploit the asset. To avoid unnecessary repetition, from here on we will only refer explicitly to the embodiment(s) of FIG. 2 and the associated teachings without explicit reference to FIG. 1 unless otherwise needed. Let us take the example of an IT asset 202H in FIG. 2, which is a File Server. Attack surface 204H associated with asset 202H may include a number identifying asset 202H. Additionally, each security aspect/attribute/property of asset 202H may also be represented by a number.

Table 1 represents some exemplary security aspects of asset 202H along with their numerical representations. The collection of these security aspects constitute the attack surface of asset 202H according to the invention, and this data is stored in corpus 206 utilizing an appropriate structure or data model.

TABLE 1

| Security aspect | Type of representation | Possible values |
| --- | --- | --- |
| 1. Is port 88 Open? | Binary representation | 0 for "not open", 1 for "open" |
| 2. Which Operating System (OS) is File Server running? | One-hot encoding | 0's and 1's with a single 1 for the OS in use, and 0 for all other OSes |
| 3. How long ago was the last OS security patch installed? | Feature scaling | Raw value in days, which can be further normalized to have the familiar zero mean and unit variance ($\mu = 0$, $\sigma^2 = 1$) |

Other examples of such security aspects/attributes include version numbers, release and/or build numbers of hardware, firmware and software, protocol stack deployed, interfaces in use, services in use, etc. Each of the above aspects may be represented in an appropriate numeric representation, some examples of which are shown in Table 1 above. Appropriate numerical representations for various security aspects may be selected according to a specific implementation, with the relevant techniques familiar to those skilled in the art.

Preferably, the vulnerability data stored in corpus 206 as described above, is derived from user-reported vulnerability data. User-reported vulnerability data refers to the vulnerability data obtained directly or indirectly from the users or customers of the particular IT asset. Among other things, this may include:
  1. System description harvested from Application Programming Interfaces (APIs) such as Amazon's Elastic Compute Cloud (EC2)
  2. Ruby Gemfiles, Python PIP files, and other package management systems files
  3. Github and other code repositories
  4. Technology stack deployed on the asset
  5. $3^{rd}$ party packages and modules installed
  6. Software release versions and patches installed
  7. Bug tickets derived from ticket management systems such as Jira
  8. Known vulnerability issues with the asset
  9. Manually provided vulnerability data by the users Still preferably, the vulnerability data stored in corpus 206 as described above, is derived from self-reported vulnerability data. Self-reported vulnerability data refers to the vulnerability data provided directly or indirectly by the entity owning/operating the particular IT asset.

Still preferably, the vulnerability data stored in corpus 206 as described above, is derived from publicly available vulnerability data related to the IT asset. Sources of such publicly available data may include:
  1. Public vulnerability databases
  2. Attack surface databases such as scans.io
  3. IP lookup databases
  4. DNS lookups
  5. Passive DNS sources In another variation, the vulnerability data stored in corpus 206 as described above, is derived from researcher-sourced vulnerability data. Researcher-sourced vulnerability data refers to the vulnerability from one or more researchers from a community of researchers or security experts. The vulnerability data provided by the researchers/experts may be in the form of vulnerability reports containing vulnerability data on various IT assets. The researchers/experts may be in-house to an organization or a part of the external crowd. The reader is referred to community of researchers/experts 212 of the embodiment of FIG. 2 and the associated teachings.

Researcher-sourced vulnerability data may come from one or more of the following sources:

1. Vulnerabilities directly reported by the researcher(s)
2. Vulnerabilities detected by scanning ports of the target IT asset of interest
3. Manual review of the attack surface of the asset by a security researcher/expert
4. Vulnerability scan of system logs (automated or manual)
5. Web spidering for detecting vulnerabilities
6. DNS hostnames enumeration by brute force guessing of common subdomains
7. Performing web searches to determine vulnerabilities
8. IP databases lookup
9. Using Open-Source Intelligence (OSINT) techniques
10. Utilizing open/closed APIs of the asset/system In yet another variation, the vulnerability data stored in corpus 206 as described above, is derived from crowd-sourced vulnerability data. Crowdsourced vulnerability data here refers to the vulnerability data obtained directly or directly from the crowd at large. This may be accomplished using rewards or initiatives such as bounty programs, or other incentives deployed to attract the collective prowess of a crowd. The vulnerability data thus gathered may be related to specific IT assets, or entities, organizations, companies, etc.

In a highly preferred embodiment of the invention, attack surfaces 204B-I related to IT assets 202B-I, are represented as feature vectors. Returning to our previous example of asset 202H and Table 1, according to the present embodiment, attack surface 204H of asset 202H will be represented as a feature vector. A feature vector is an n-dimensional vector of numerical features representing an object. Those skilled in the art will understand that in machine learning and pattern recognition, many techniques require a numerical representation of objects to facilitate statistical analysis and processing. Feature vectors can also employ weights, and the vector space associated with these feature vectors is sometimes called the feature space.

Thus, attack surface 204H associated with asset 202H is represented by a fixed-length vector obtained by concatenating the values of security aspects/attributes/properties in Table 1. An exemplary attack surface 204H, represented as a feature vector, according to the present invention may be [1, Windows Server 2012 R2, 27] representing that port 88 of File Server asset 202H is open, the system is running Windows Server 2012 R2 and it has been 27 days since the last security patch was installed on the server. Alternatively, attack surface 204H may be represented as feature vector [0, Ubuntu Server 16.04.1 LTS, 1.4] representing that port 88 is not open, the system/server is running Ubuntu Server 16.04.1 LTS, and on a normalized ($\mu=0$, $\sigma^2=1$) scale, it has been 1.5 days since the last security patch was installed on the system/server. Note that in practice, there may be many more components in a feature vector related to an IT asset rather than the three exemplified above for ease of explanation.

Figure 3:
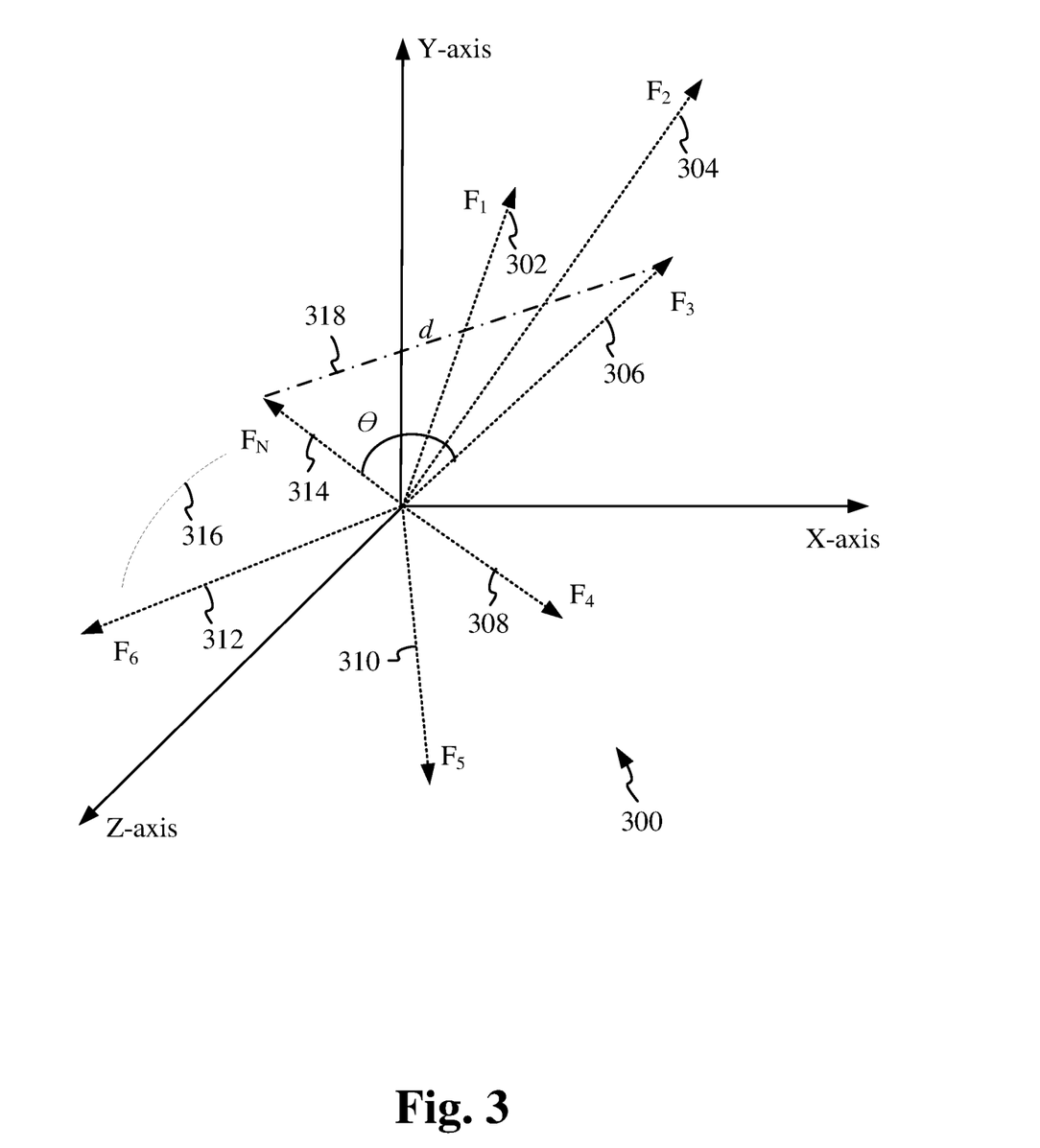
FIG. 3 is a diagram visualizing a feature space in which feature vectors associated with the IT assets are contained.
Figure 6:
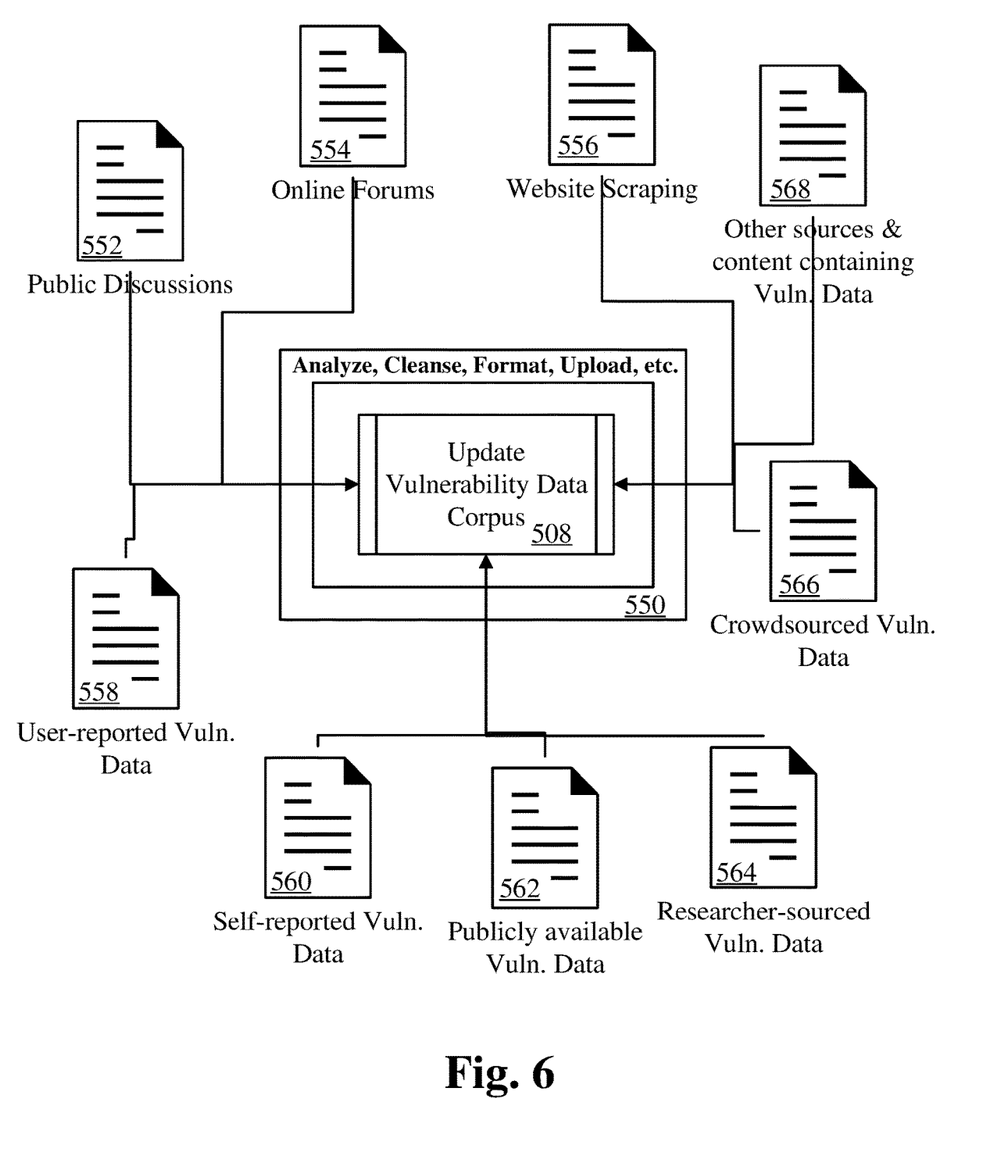
FIG. 6 shows a detailed view from FIG. 5 of the sub-process for populating and updating the vulnerability data corpus.

With the above knowledge of the teachings of the invention, let us move on to FIG. 3 which visualizes an attack surface vector space or a feature vector space or more simply a feature space 300 containing feature vectors $F_1 \ldots F_N$ in X, Y and Z dimensions. For clarity, FIG. 6 shows feature vectors $F_1, F_2, F_3, F_4, F_5$ and $F_6$, represented respectively by reference numerals 302, 304, 306, 308, 310, and 312. Any other feature vectors in feature space 300, up to and including feature vector $F_N$ represented by reference numeral 314, are shown by curved dashed line 316 extending from vector $F_6$ to $F_N$.

Feature vector $F_1 \ldots F_N$ of FIG. 3 correspond to N attack surfaces associated with the corresponding N IT assets (not shown) according to previous teachings. Note that for clarity of depiction in a 2-D illustration, space 300 is confined to a 3-D space with X, Y and Z dimensions representing three components for representing the values of the three security aspects of the vulnerability data of an asset (see the example of Table 1 above). However, the invention admits of any number of such components or security aspect/attribute values required to adequately represent the attack surface of IT assets, and henceforth of any number of dimensions of feature space 300.

Let us assume that feature vector $F_3$ corresponds to a target IT asset for which we are interested in detecting unknown vulnerability/vulnerabilities. Therefore, feature vectors $F_1$, $F_2$ represented by reference numerals 302, 304 and feature vectors $F_4$-$F_N$ represented by reference numerals 308-314 belong to the remainder of the IT assets whose known vulnerabilities are housed in a vulnerability database/corpus (not shown) according to earlier teachings (see FIG. 1/FIG. 2 and vulnerability corpus 106/206).

In a highly preferred embodiment of the instant invention, a measure of similarity or matching, or similarity measure for short, between feature vector $F_3$ of interest and feature vectors $F_1$, $F_2$ and $F_4$-$F_N$ of the remainder IT assets is determined based on a measure of distance in feature space 300 between vector $F_3$ and vectors $F_1, F_2, F_4$-$F_N$. Preferably, the measure of distance is a Euclidean distance between vectors $F_3$ and vectors $F_1, F_2, F_4$-$F_N$ in feature space 300. As will be recognized by those skilled in the art, Euclidean distance between two vectors $F_3=[F_{3x}, F_{3y}, F_{3z}]$ and $F_N=[F_{Nx}, F_{Ny}, F_{Nz}]$ is defined by:

$$d=\overline{F_3 F_N}=\sqrt{(F_{3x}-F_{Nx})^2+(F_{3y}-F_{Ny})^2+(F_{3z}-F_{Nz})^2} \qquad \text{Eq. (1)}$$

This Euclidean distance between vectors $F_3$ and $F_N$ is shown by dot-and-dashed line 318 in FIG. 3. According to the invention, similarity measure between vectors $F_3$ and $F_N$ as a function of distance d may be defined by the formula expressed in the equation:

$$\text{similarity} = \frac{1}{1+d} \qquad \text{Eq. (2)}$$

Vector of interest $F_3$ is considered most similar to that vector amongst vectors $F_1$, $F_2$ and $F_4$-$F_N$ with which it has the similarity measure as computed by Eq. 2, closest to 1. Note that similarity measure given by Eq. 2 obeys the inequality $0 \leq \text{similarity} \leq 1$, because $d \geq 0$. The unknown vulnerability/vulnerabilities in the target IT asset corresponding to target feature vector $F_3$ are then determined to be the same or similar as the known 830 vulnerability/vulnerabilities in the IT asset(s) corresponding to the feature vector(s) that are most similar to $F_3$. Note that similarity measure in Eq. 2 will yield 1 if the measured feature vectors are identical or have a distance d between them of 0 as computed by Eq. 1 above.

Figure 4:
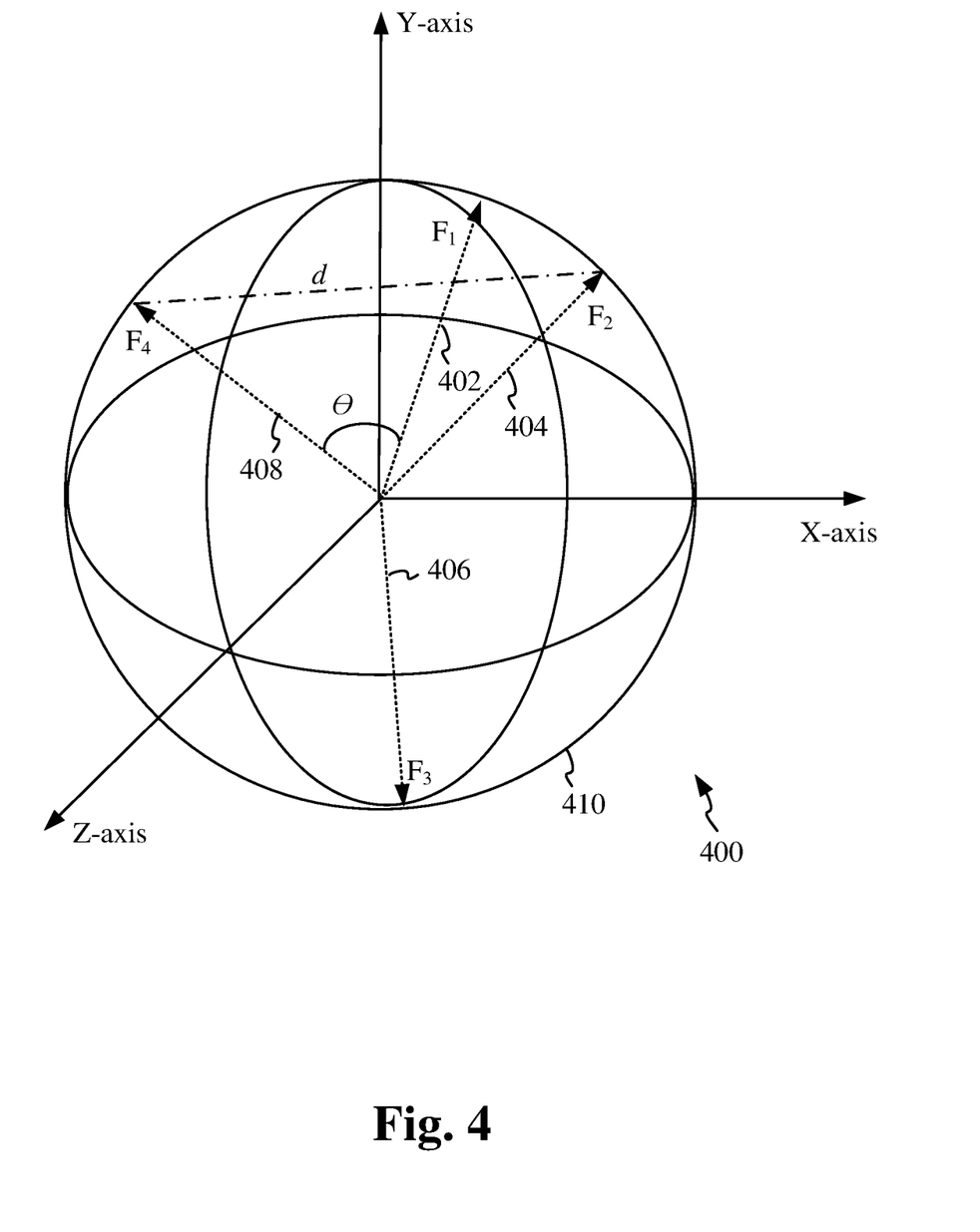
FIG. 4 is a diagram visualizing a feature space in which unit-length feature vectors associated with the IT assets are contained.

In an alternative variation of the above embodiment, similarity measure between two vectors is determined based on their cosine similarity. Feature space 400 for such an embodiment is visualized in FIG. 4 containing four feature vectors $F_1, F_2, F_3$ and $F_4$ represented by reference numerals 402, 404, 406 and 408 respectively. Similarity measure between vectors $F_2$ and $F_4$ in feature space 400, is expressed by:

$$\text{similarity} = \cos(\theta) = \frac{F_2 \cdot F_4}{\|F_2\|\|F_4\|} = \frac{F_{2x}F_{4x} + F_{2y}F_{4y} + F_{2z}F_{4z}}{\sqrt{(F_{2x} + F_{2y} + F_{2z})^2}\sqrt{(F_{4x} + F_{4y} + F_{4z})^2}} \quad \text{Eq. 3}$$

Cosine similarity is a measure of orientation and is useful where the magnitudes of vectors are normalized to the interval [0,1]. Such a normalization is visualized by imaginary unit circle 410 in feature space 400 of FIG. 4, where all feature vectors $F_1$-$F_4$ are normalized to unit-length. The angle θ between feature vectors $F_2$ and $F_4$ is also shown in FIG. 4. Based on Eq. 3 above, feature vector $F_2$ is considered to be the most similar to that feature vector in feature space 400 with which it has the similarity measure closest to 1. That is because Cosine of 0 is 1 while the magnitude of all feature vectors are bounded by the interval [0,1].

Aside from the above techniques of computing similarity measures explicitly taught, the invention admits of any other measures of distance and similarity and applying them for vulnerability detection according to the above teachings. Several measures of distance/similarity may be utilized to see if a target feature vector is similar/close to other feature vectors in a feature space, such as feature spaces 300/400 of FIG. 3/FIG. 4. These include Squared Euclidean Distance, Normalized Squared Euclidean Distance, Manhattan Distance, Chessboard Distance, Bray Curtis Distance, Canberra Distance, Cosine Distance, Correlation Distance, Binary Distance, Warping Distance, Canonical Warping Distance, etc.

The above measures and the corresponding expressions to compute them will be familiar to those with ordinary skill in the art and will not be delved into detail here. In the context of the present invention, the above measures will be computed in a feature space containing feature vectors corresponding to the IT assets, and unknown vulnerability/vulnerabilities detected according to the disclosed teachings.

It should be clear by now that a target IT asset in which unknown vulnerabilities are to be detected is measured for closeness or similarity to other feature vectors. Unknown vulnerability/vulnerabilities are then determined in the target asset based on its closest neighbor(s) in the feature space. It is possible for the target feature vector to be identical to one or more other feature vectors i.e. similarity=1 per Eq. 2-3. In such a scenario, the corresponding target IT asset is likely to have the same vulnerability/vulnerabilities as the other asset(s) corresponding to the identical feature vector(s).

In cases where the most similar asset/system is not identical but somewhat similar to the target asset/system, the target asset/system is likely to have similar vulnerability/vulnerabilities as the asset/system it is similar to. In other words, it is possible to have more than one assets to which a target asset is similar to. In such a scenario, the target system is likely to have the same/similar vulnerability/vulnerabilities as those related to the other more than one systems. In still another variation, it is possible to have a matched/similarity list of assets sorted in order of similarity to which a target system is similar to. In such a variation, a list of probabilities or likelihood that the target asset will exhibit certain vulnerabilities can be created, based on the target asset's measure of similarity to the other assets in the list.

In any event, it is highly desirable to bring to bear the capability and prowess of the crowd/community to make the final determination based on their collective knowledge and skills, according to the preferred embodiments disclosed herein. This is preferably accomplished by having one or more researchers/experts from a community of researchers/experts review the results of similarity matching before making a final determination of the unknown vulnerability/vulnerabilities in the target asset. In other words, the results from similarity measures using the above teachings are reviewed by one or more security experts/researchers skilled in the field. Then based on the individual or collective knowledge of the researchers, a final determination of unknown vulnerability/vulnerabilities in the target asset is made.

Skilled experts or researchers may apply their previous knowledge of same/similar systems/assets as the target asset/system with its peculiarities and behaviors, to refine the results. Such a human insight is invaluable, particularly when an entire community of researchers/experts (in-house or external) is brought to bear under a crowdsourcing regime.

Figure 5:
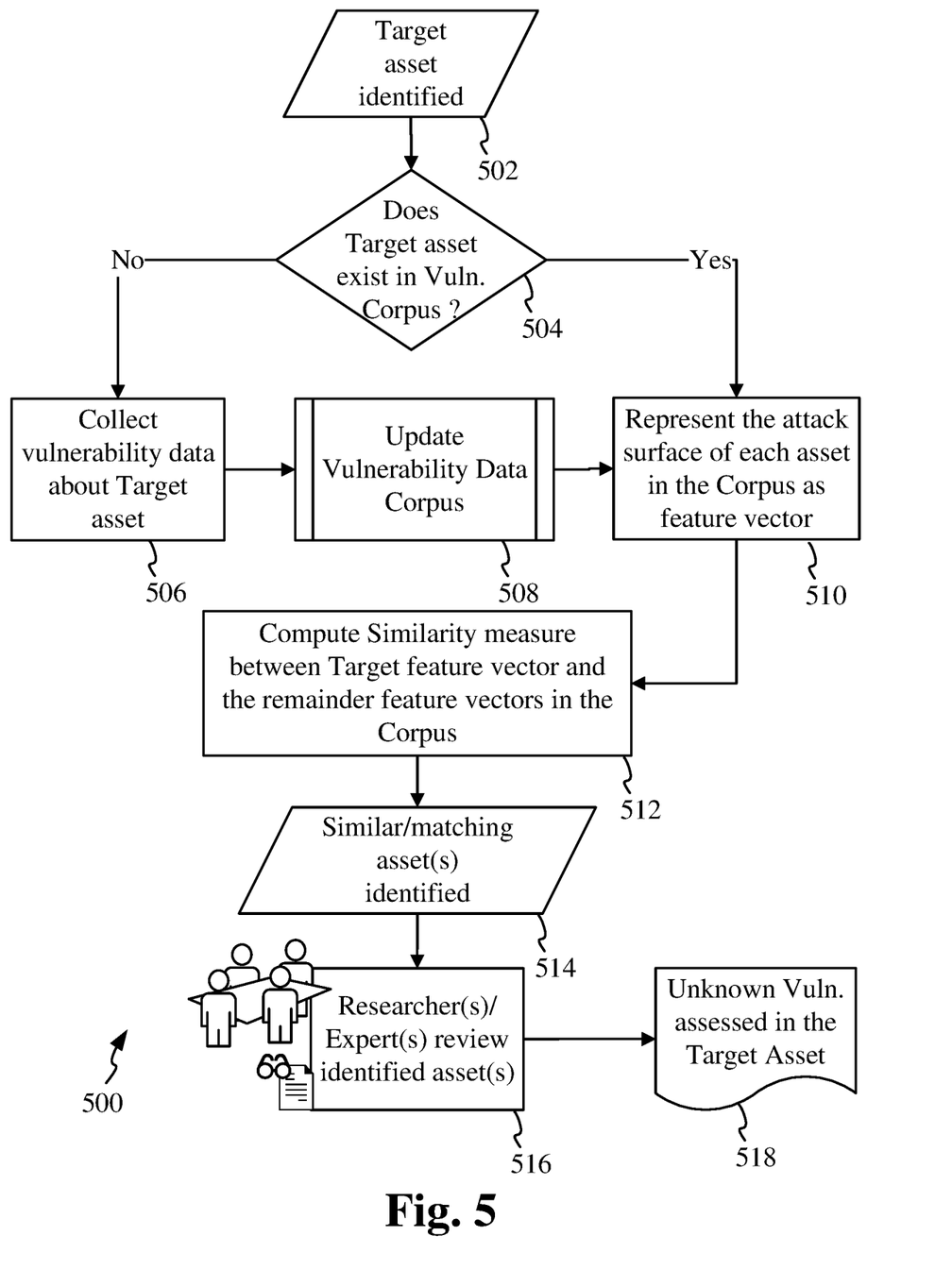
FIG. 5 is a flowchart illustrating exemplary steps required for detecting vulnerability/vulnerabilities according to the invention.

Flowchart 500 in FIG. 5 illustrates the exemplary steps required to operate a cybersecurity system according to the present invention. In the exemplary embodiment related to FIG. 5, a target asset is identified whose unknown vulnerabilities are to be detected. This identification shown by parallelogram 502, may be an external input or query into the cybersecurity system, or an internally generated input. Nonetheless, a decision is made as to whether the target asset, or more specifically its vulnerability data, already exists in the vulnerability corpus/database (not shown). This decision is illustrated by decision diamond 504.

The target asset may not exist in the vulnerability corpus, as shown by the "No" arrow emanating from decision diamond 504. In this case, vulnerability data about the target asset is collected using the teachings provided above, and as represented by box 506. The vulnerability data thus obtained about the target asset is used to populate or further enrich the vulnerability corpus, as represented by sub-process box 508. On the other hand, the target asset may already exist in the vulnerability corpus as shown by the "Yes" arrow emanating from decision diamond 504.

In either case, whether the target asset already exists in the corpus or not, the attack surfaces of all assets in the corpus are represented by feature vectors as taught above. This is indicated by box 510—recall that attack surfaces are based on the vulnerability data about the assets in the corpus. At this stage, similarity measures between the target feature vector corresponding to the target asset, and the feature vectors corresponding to the remainder IT assets in the corpus, are computed. The similarity computation(s) using the above taught techniques is represented by box 512.

Based on the similarity measurements, one or more assets in the corpus are identified that the target asset most resembles or matches or is similar to. This identification is represented by parallelogram 514. At this stage, based on the crowdsourcing model taught herein, one or more security experts/researchers are engaged to review the results from similarity measurements. This researcher/expert engagement and review process is indicated by box 516. Then on the basis of the review by the researcher(s), which may be an individual review of a researcher, or the collective insight of a subset or the whole community of researchers, a final assessment or determination of the unknown vulnerability/vulnerabilities in the target system is made. This final assessment or determination is indicated by output 518 in FIG. 5.

In a preferred variation of the above scheme, one or more researchers are first matched to the target asset before they are engaged/involved in the review process. This matching is done based on the background of the researcher(s) and the specification of the target asset. Such a matching helps in better utilization of the valuable researcher/expert resources, as well as better accuracy of final results. That is because these researchers can employ their personal knowledge of such systems from their experience and refine or fine-tune the final results. Moreover, researchers may also be partitioned into various categories according to their background and skills. Then based on the asset(s) identified to be similar to the target asset according to the above teachings, a particular category of researchers matching those asset(s) may be called into action.

It should be understood that the vulnerability corpus according to the present teachings is continuously updated as new types of vulnerability data comes in. Such updates may happen weekly, daily or even multiple times a day. That is why box 508 in FIG. 5 is shown as a sub-process box. The updates to the corpus may be based on vulnerability data obtained from one or more of the various vulnerability data sources taught above.

To illustrate this, an exploded view of this process is shown in FIG. 6. FIG. 6 shows vulnerability data corpus update sub-process 508 from FIG. 5. As mentioned, updates to vulnerability data corpus may happen periodically or on demand. These updates harness vulnerability data about IT assets from a variety of sources. As illustrated in FIG. 6, there are a number of sources of such vulnerability data of the IT assets desired/targeted to be in the corpus. These include relevant public discussions 552, relevant online forums 554, scraping of related websites 556, utilizing user-reported vulnerability data 558, self-reported vulnerability data 560, publicly available vulnerability 562, researcher-sourced vulnerability data 564, crowdsourced vulnerability data 556, etc.

FIG. 6 also shows a catchall source of data 568 that may include any other sources of information related to IT vulnerabilities for the assets being targeted or whose vulnerability data is desired to be in the corpus. Notice preprocessing layer 550 in FIG. 6 that represents any particular preparatory steps required to parse, analyze and organize vulnerability data from the above mentioned sources, prior to its loading in the corpus. Preprocessing steps may also include any data cleansing and formatting activities. All such above preprocessing steps may need to be tailored according to the content obtained from specific data sources, as will be appreciated by those skilled in the art.

In a highly advantageous set of embodiments, machine learning techniques are employed in the determination of the similarity measure taught above. These techniques may further employ supervised and/or unsupervised components. Supervised machine learning may be used to train a model. The model may answer questions that enable the determination of the similarity measure between a target asset and other assets in the corpus with known vulnerabilities. For example, based on the feature vectors of the target asset and other assets, the model may answer a question such as "Is the target asset susceptible to a known vulnerability?".

Similarly, unsupervised machine learning techniques may also be employed to determine the similarity measure according to the invention. These techniques include clustering, random forest predictors and decision trees, etc. Those skilled in the art of machine learning will understand that a random forest predictor is a collection of individual classification tree predictors. In the present context, the random forest construction would allow the determination of similarity measure between two feature vectors by counting the number of times a tree predictor places them in the same terminal node. Synthetic data may first be generated to represent the null hypothesis of no similarity between the feature vectors. Then a random forest predictor would be constructed to distinguish observed data from synthetic data.

In a preferred embodiment, a zero-day vulnerability is detected using the above techniques. A zero-day vulnerability refers to a vulnerability which is unknown to the vendor or the provider of the target IT asset in question. Typically, in the context of a software, a zero-day vulnerability may be exploited by hackers before the software vendor becomes aware of it and fixes it. The vulnerability may be in the base operating system or a third party software running on the target IT asset. The exploitation of zero-day vulnerabilities is often emblematic of disastrous consequences. As such, cybersecurity system and its methods taught in the disclosure provided herein are of particular interest in addressing zero-day vulnerabilities.

It should be noted that in the above teachings, while oftentimes we have used the notion of a target asset in the singular, it is understood that the vulnerability detection techniques apply equally to multiple target assets in which unknown vulnerability/vulnerabilities are to be detected. Thus in an exemplary process, unknown vulnerabilities in one target asset amongst a set of target assets are detected during one iteration. Based on this knowledge of unknown vulnerabilities that have now become known, the corpus of known vulnerabilities is then updated. Then the process is repeated for other target assets.

Alternatively, vulnerabilities in more than one target assets may be detected in a single iteration by utilizing the distance and similarity measures between the target feature vectors and the feature vectors associated with assets with known vulnerabilities, per above teachings.

The unknown vulnerability/vulnerabilities detected in a target system of interest according to the present teachings, may be used for a number of purposes. In one embodiment, based on the vulnerability/vulnerabilities detected, an appropriate product recommendation is made to the entity/entities owning or associated with the target asset. Such a recommendation, that may lead to a sale, may be for a fixed or a secure version of the asset, and/or for a cybersecurity product capable of detecting and addressing such vulnerabilities for the entity/entities in the future. The entity/entities presumably have many other same/similar assets. In a related variation, vulnerability/vulnerabilities detected above are used to develop a marketing strategy and message. Such a marketing strategy may include marketing more secure products or technology stacks for entities similar to the one related to the target asset.

In yet another variation, vulnerability/vulnerabilities detected above are used for operational purposes. Vulnerability/vulnerabilities detected above may also be used to determine a vulnerability rating for the asset and/or the entity/entities owning/operating the asset. Such a vulnerability rating may be established across the globe, or across an industry or a vertical, or across asset types, or across the types of customers that the entity/entities have, etc. The vulnerability rating may either be published or otherwise made available to a concerned party under appropriate measures of control.

Such a vulnerability rating may also be an up-to-the-moment rating that is continuously updated using the above provided techniques. New vulnerability data about existing assets in the corpus and vulnerability data about newly identified assets may come in frequently and regularly. As such it is useful to regularly/continuously update the vulnerability rating of assets that need to be rated in the corpus.

In an exemplary process to achieve the above, all assets within the corpus that need to be rated may be matched to the remaining assets. In an iterative fashion, an asset to be rated is selected as the target asset and its vulnerabilities are detected per above teachings, and a corresponding rating of the asset updated. Then in the next iteration, the next asset whose rating needs to be updated is selected as the target asset, and the process is repeated. The update frequency may be regular or the update may be performed on-demand. Instead of, or in addition, the same process may be carried out with respect to one or more entities, organizations or companies associated with the assets, rather than just the assets themselves.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A cybersecurity system, comprising:
   (a) a target asset amongst a plurality of Information Technology (IT) assets;
   (b) a collection of known vulnerabilities related to said IT assets;
   (c) an attack surface related to each of said IT assets, said attack surface represented as a feature vector; and
   (d) a similarity measure between said target asset and the remainder of said IT assets excluding said target asset, said similarity measure based on said attack surface;
   wherein an unknown vulnerability related to said target asset is detected based on said similarity measure.

2. The system of claim 1, wherein a community of researchers is utilized in the population of said collection of known vulnerabilities.

3. The system of claim 2, wherein said detecting of said unknown vulnerability is facilitated by one or more from amongst said community of researchers.

4. The system of claim 1, wherein at least one bounty program is used in the population of said collection of known vulnerabilities.

5. The system of claim 1, wherein at least one item selected from the group consisting of public discussions, online forums, website scraping, user-reported vulnerability data, self-reported vulnerability data, publicly available vulnerability data, researcher-sourced vulnerability data, and crowdsourced vulnerability data is utilized in the population of said collection of known vulnerabilities.

6. The system of claim 1, wherein said feature vector of said target asset and a second said feature vector of an IT asset from the remainder of said IT assets excluding said target asset, are contained in a feature space, and said similarity measure is based on a Euclidean distance between said feature vector and said second feature vector.

7. The system of claim 1, wherein said feature vector of said target asset and a second said feature vector of an IT asset from the remainder of said IT assets excluding said target asset, are contained in a feature space and are normalized to unit-length, and said similarity measure is based on a Cosine similarity between said feature vector and said second feature vector.

8. The system of claim 1, further utilizing machine learning in the determination of said similarity measure.

9. The system of claim 1, wherein said unknown vulnerability is detected for at least one purpose selected from the group consisting of marketing, sales and operations.

10. The system of claim 1, wherein said unknown vulnerability is a zero-day vulnerability.

* * * * *